United States Patent [19]

Fujita et al.

[11] 4,110,766
[45] Aug. 29, 1978

[54] SUPERIMPOSING DEVICE FOR USE IN A DATA-RECORDING CAMERA

[75] Inventors: Susumu Fujita; Yoichi Hamada, both of Kobe; Makoto Kuboshima, Sagamihara, all of Japan

[73] Assignee: Fuji Photo Film Co., Ltd., Minami Ashigara, Japan

[21] Appl. No.: 852,261

[22] Filed: Nov. 17, 1977

[30] Foreign Application Priority Data

Nov. 19, 1976 [JP] Japan .................. 51-139667

[51] Int. Cl.² ............... G03B 17/24; G03B 13/02
[52] U.S. Cl. ............................. 354/106; 354/219
[58] Field of Search ................. 354/105–109, 354/221, 222, 225, 199, 219, 224; 352/171

[56] References Cited

U.S. PATENT DOCUMENTS 1,974,174  9/1934  Chamberlain .................. 354/105
3,995,289  11/1976  Shono .......................... 354/109

FOREIGN PATENT DOCUMENTS 2,604,067  8/1976  Fed. Rep. of Germany ........ 354/106

Primary Examiner—Donald A. Griffin
Attorney, Agent, or Firm—Sughrue, Rothwell, Mion, Zinn and Macpeak

[57] ABSTRACT

A camera having a superimposing device for superimposing data such as date of photograph taking on a film surface, includes a mechanism for projecting such data in a viewfinder. The superimposing device includes a first optical path for projecting a light image of the object onto an eye-piece of the viewfinder, a second optical path for projecting a light image of the data onto the eye-piece at one predetermined portion thereof and means for forming background for the data projected in the eye-piece.

7 Claims, 7 Drawing Figures

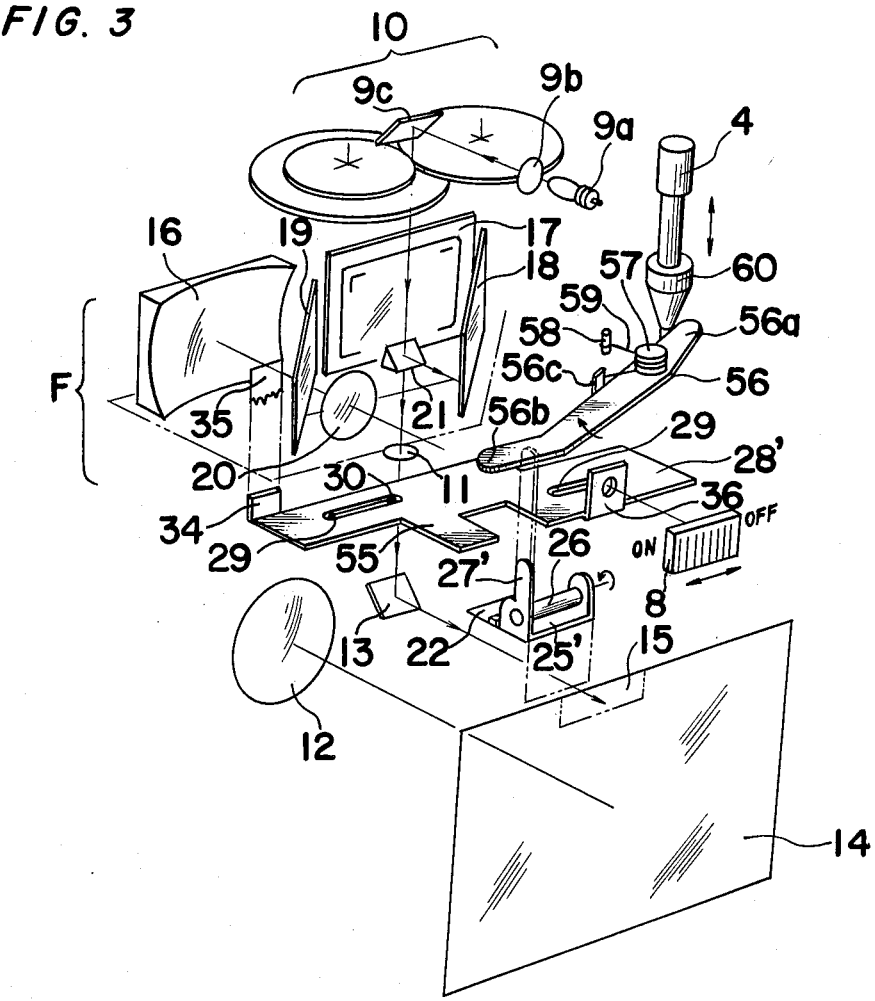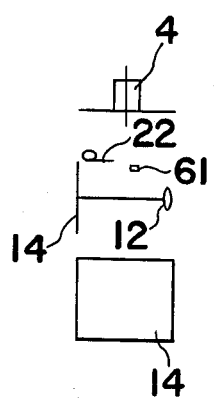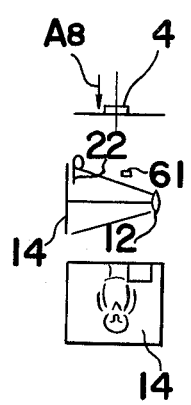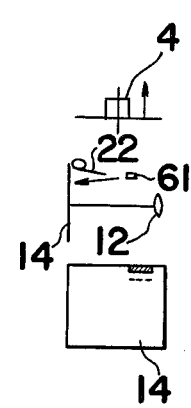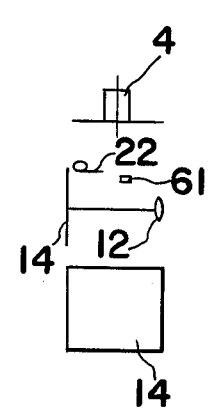

SUPERIMPOSING DEVICE FOR USE IN A DATA-RECORDING CAMERA

FIELD OF THE INVENTION

The present invention relates to a data recording camera, and more particularly, to an improvement in a device for superimposing data or indicia on a film and for projecting such data in a viewfinder of the camera.

Conventionally, there have been proposed various types of data recording camera wherein the film exposed to imagewise light of an object to be photographed is superimposed with data such as date of photograph taken, order of sequence of photograph taking, exposure parameters, etc. The data are normally imprinted at a portion adjacent to one edge of the exposed area of the photograph with characters or numbers in comparatively bright color such as yellow, so that in the normal photograph, the data are clear enough to read with respect to a background formed around the data. Such background, namely original background, in this case is established by the part of photograph.

However, in the case where the data recorded are marked in white on a completed photographic print, there is the disadvantage that if the scene photographed is for example a snow landscape or other scene which is very bright such as clear sky, or that if the portion of the photographed scene in which the data recorded area lies is very bright, for example a white shirt or glass which is taken by a flashlight, it is very difficult or impossible to distinguish the items of recorded data from the background.

To overcome such disadvantage as described above, there is proposed means for defining background for the data on a film surface in a relating application Ser. No. 852,188 filed Nov. 17, 1977, in the names of SUSUMU FUJITA, Y. HAMADA and M. KUBOSHIMA who are the same inventors as the present invention, and entitled "SUPERIMPOSING DEVICE FOR USE IN A DATA-RECORDING CAMERA".

Recently, the superimposing device employed in the camera is often provided with means for establishing a mark in a viewfinder of the camera to indicate that the data is ready to be projected onto the film surface. According to one method, the mark is merely a spotted light or a similar mark appearing at the peripheral edge portion in the viewfinder. However, such mark does not teach the photographer the detail of the data. In another method, the mark corresponds to the data which are projected onto the film surface. However, there still lies the disadvantage that if the scene is very bright, it is very difficult or impossible to distinguish the item of the data appearing in the viewfinder from the background.

Accordingly, it is a primary object of the present invention to provide a superimposing device having means for defining background for the data appearing in the viewfinder.

It is another object of the present invention to provide a superimposing device of the above described type which is compact in size and simple in construction, and can be readily incorporated into cameras of various types at low cost.

SUMMARY OF THE INVENTION

In order to accomplish these and other objects, the superimposing device of the present invention for use in a data-recording camera for superimposing data on a film and for producing the data in the viewfinder having a view taking window for receiving therein light image of an object and eye-piece, comprises; means for defining a first optical path for projecting the light image of the object onto the eye-piece; means for defining a second optical path for projecting the light image of the data onto the eye-piece at one predetermined portion thereof; blocking means provided adjacent the view taking window capable of changing condition thereof between a blocking condition, in which the blocking means intercepts the first optical path to block the light directed to the one portion of the eye-piece and an open condition, in which the blocking means is released from blocking the first optical path; and actuating means provided for shifting the blocking means into the open condition, whereby upon actuation of the actuating means, the blocking means prevents the one portion of the eye-piece constituting a background of the data from being lighted by the light image of the object and thus the data is clearly formed in the one portion of the eye-piece.

It is to be noted that the blocking means can be made of transparent material or opaque material.

With such arrangement of the superimposing device of the present invention, the photographer can acknowledge the presence of the data to be projected onto the film surface as well as the detail thereof through the viewfinder with a background which clearly and definitely establishes the data.

These and other objects and features of the present invention will become apparent from the following description taken in conjunction with preferred embodiments thereof with reference to the accompanying drawings.

BRIEF DESCRIPTION OF THE DRAWINGS

FIG. 3 is a similar view to FIG. 2, but particularly showing another embodiment thereof;

FIGS. 4a, 4b, 4c and 4d are explanatory views showing the operations of superimposing device shown in FIG. 3.

Before the description of the present invention proceeds, it is to be noted that like parts are designated by like reference numerals throughout the accompanying drawings.

DESCRIPTION OF THE PREFERRED EMBODIMENTS

Figure 1:
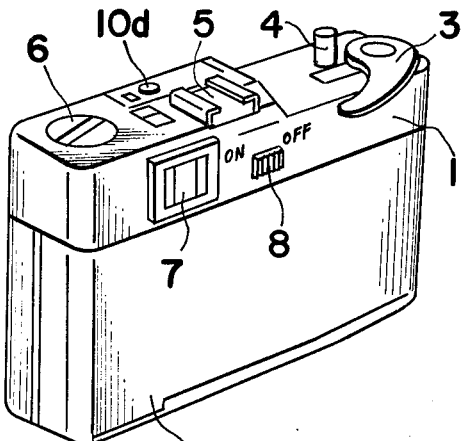
FIG. 1 is a perspective view of a data-recording camera in which a superimposing device of the present invention is incorporated.

Referring to FIG. 1, a camera provided with a device for superimposing data or indicia on a film, namely data-recording camera, has a body 1 of rectangular and comparatively thin box-like shape and a back cover 2. The term "indicia" herein referred to may include any information desired to be photographed together with an image of the object to be photographed through a picture taking lens system, such as date of photograph, order of sequence of photographying, exposure parameters, etc. Provided on top of the body 1 are various functioning elements for operating the camera such as a film advance lever 3, a shutter release button 4, an accessory shoe 5, and a film rewinding crank 6, as in the ordinary cameras, and provided at the back and upper side of the body 1 are viewfinder 7 and a switch knob 8 which is slidable between "on" and "off" positions for manually controlling the superimposing device of the present invention. It is to be noted that the word "front" herein referred to may indicate a side where the camera receives light and that the word "back" herein referred to may indicate a side where back cover 2 is provided.

Figure 2:
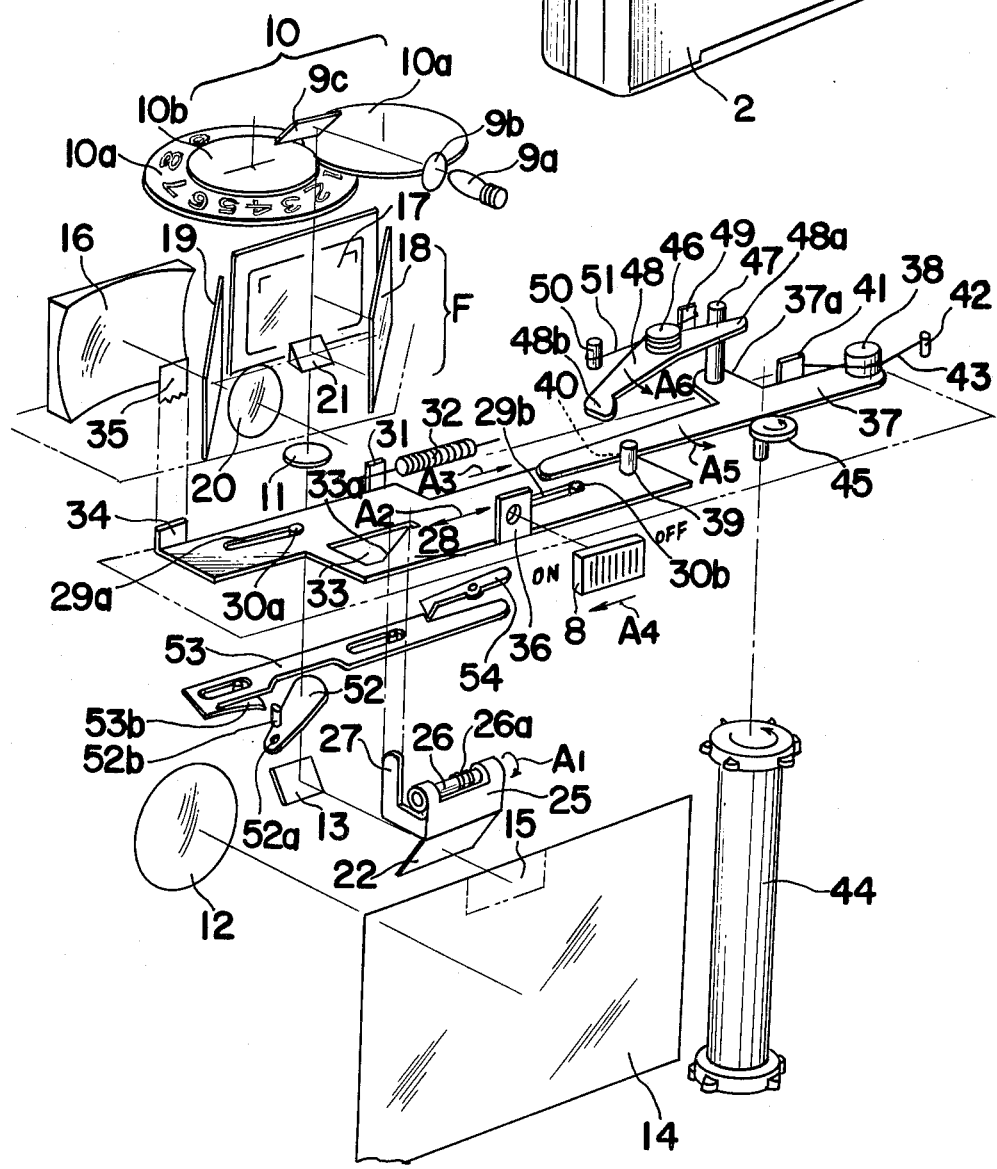
FIG. 2 is a partial schematic, exploded view showing an arrangement of the superimposing device of the present invention.

Referring to FIG. 2, the camera shown in FIG. 1 includes an optical arrangement F of bright frame viewfinder of known type including an objective lens 16 fixedly provided at front and upper side of the body 1 and a transparent glass 17 positioned closely adjacent and at side of the objective lens 16. The transparent glass 17 has frame lines drawn therein for showing the frame or range of each view aimed at through the viewfiner 7. The optical arrangement F further includes a reflective mirror 18 positioned inside the body 1 and behind the transparent glass 17 in a slanted relation to the transparent glass 17, and a half-mirror 19 positioned behind the objective lens 16 in a slanted relation thereto. Further provided behind the half-mirror 19 is an eye-piece 20 which is fixedly mounted in a frame of the viewfinder 7. The light rays reflected from the object to be photographed are partly transmitted through the objective lens 16, the half-mirror 19 and the eye-piece 20 towards the eye of the photographer, while at the same time, the light rays reflected from the same object are transmitted through the transparent glass 17 and are reflected by the mirror 18 and the half-mirror 19 and are directed towards the eye of the photographer through the eye-piece 20 together with the light rays transmitted through the objective lens 16.

Provided above the optical arrangement F is an information light source 10 including data disk 10a which is mounted on a shaft (not shown) to rotate the data disk 10a thereabout by a suitable train of gears 10b and 10c upon turning of a dial 10d provided on top of the body 1 (FIG. 1), and a source of light having a lamp 9a, a condenser lens 9b and a reflective mirror 9c which are arranged to direct bundle of light rays emitted from the lamp 9a towards the one peripheral edge portion of the data disk 10a in approximately perpendicular relation thereto. The portion adjacent the peripheral edge of the data disk 10a is blanked out in shapes of various characters and/or numbers in a predetermined distance spaced apart from each other and each of which represents particular indicia for one information so that the light rays passing through the data disk 10a carry the information formed in the data disk 10a in the form of light images. Although the information light source 10 shown in FIG. 2 consists of only one disk 10a, it is possible to arrange further data disks of similar type closely adjacent the data disk 10a to form the information in combination of number of indicum.

The light images formed by the data disk 10a are projected perpendicularly, through a suitable lens 11 and a reflective mirror 13, onto a data recording area 15 provided in a light exposing area 14 where the image of the object is properly focused thereon by a suitable lens assembly 12 shown as consisting of only one lens for the sake of brevity. The light exposing area 14 corresponds to a film surface. It is to be noted that the reflective mirror 13 is sufficiently separated away from an optical axis of the lens assembly 12 to prevent the light rays passing through the lens assembly 12 from being hindered by the reflective mirror 13. It is also to be noted that the lamp 9a described as provided for the source of light is supplied with electric power through a suitable control means (not shown) which is so arranged as to energize the lamp 9a a predetermined period of time after the release of shutter button 4 during on state of the control means. When it is not necessary to form the data on the film surface, the control means is turned to the off state. In addition to the control means, a switch (not shown) may be provided for intentionally turning on the lamp 9a regardless of release of the shutter button 4.

The light images formed by the data disk 10a are also projected onto the mirror 18 by a semitransparent prism 21 provided between the transparent glass 17 and the mirror 18. The prims 21 is carefully adjusted to a proper position to have the projected light image onto the mirror 18 correspond, in position, with the projected light image onto the light exposing area 14, so that the photographer, when aiming at the object, can have the same data formed in the viewfinder as the data which will be formed in the developed picture at approximately same place. Such correspondance in positioning the data in the viewfinder with that in the film surface helps the photographer to judge the necessity of forming the data in the photograph, whether or not it is spoiling the scenery.

Provided in front of and adjacent the data recording area 15 is a blocking means, having a cover member 22 made of light transmissive material for reducing the intensity of light passing therethrough. The cover member 22 is hingedly provided on a shaft 26, through a support member 25, to rotate about the shaft 26 between a covering position, as shown in FIG. 2, and an uncovering position where the cover member is rotated approximately 90° in a direction indicated by an arrow $A_1$. The cover member 22 is normally biased towards the covering position by a helical spring 26a having one end thereof engaged with shaft 26 and the other end thereof engaged with the support member 25. Since the cover member 22, when it is turned to the covering position, is approximately in perpendicular relation to the light rays coming from the reflective mirror 13, the size and the configuration of the area 15 corresponds with that of the cover member 22.

Accordingly, when the cover member 22 is rotated to the covering position, the data recording area 15 in the film surface is shaded thereby and exposed with less light than other areas on the film surface depending on the degree of transparency of the cover member 22. In this respect, the cover member 22 is preferably formed by a colored filter such as light blue filter for reducing intensity of the light rays produced from the object and directed to the recording area 15, especially when the object is glittering white such as snow or white shirt, etc., so that the recording area 15 on the film surface is left unexposed to some degrees by the white light and thus providing the background for the data. After exposing the light image of the object on the film surface, that is after the release of the shutter mechanism (not shown), the recording area 15 on the film surface is exposed with light rays coming from the information light source 10 carrying data in the form of light image, normally presented in yellow. Such light rays carrying data are bright enough to form a discriminative image on the film surface, via the cover member 22. It is found by the present inventors that too dark the color of the filter, that is cover member 22, will not provide enough discriminative data image of the area 15 through the cover member 22.

In the case where the scene is not so bright as the snow or white shirt, the cover member 22 can be maintained at the uncovering position to provide original scene as the background for the data.

Provided between the lens 11 and the reflective mirror 13 is a normally closed gate means comprising a gate plate 52, an actuating plate 53 and an engaging arm 54. The gate plate 52 is rotatably supported on the body 1 and an opening 52a and has a projection 52b. The gate plate 52 is normally biased to rotate in a counterclockwise direction by a suitable spring means (not shown). The actuating plate 53, being so arranged as to move reciprocally along guiding openings formed therein, is normally biased towards right-hand side direction and has an arm member 53b which contacts and further pushes the projection 52b when moved towards the right-hand side direction. The engaging arm 54 is normally engaged with the actuating plate 53 for maintaining the actuating plate 53 in the left most side shifted position. The engaging arm 54 is connected to the shutter button 4 and is disengaged from the actuating plate 53 upon depression of the shutter button, i.e., upon release of the shutter mechanism so as to push aside the gate plate 52 to allow the light image of data to pass therethrough. With the presentation of such gate means, it is possible to project the light image of data only on the eye-piece of the viewfinder and not on the film surface. Therefore, it is possible to confirm the data in the viewfinder without releasing the shutter mechanism.

Since the gate means described above is given in detail in U.S. Pat. No. 4,001,850, further description therefor is omitted for the sake of brevity. It is to be noted that the gate means described as positioned between the lens 11 and the reflective mirror 13 may be provided at any other position in the optical path for the light image of data between the prism 21 and the cover member 22. Instead of providing the above described type of gate means, it is possible to arrange another type of gate means which may be connected to the prism 21 to reciprocate the same. In this case, the prism 21 described as being of semitransparent type, should be a full reflective type prism for normally reflecting the image light of data towards the mirror 18 and further to the eye-piece of the viewfinder. Upon release of the shutter mechanism, the prism is reciprocated to allow the image light of data to pass therethrough towards the film.

The description hereinbelow is directed to a mechanism for actuating the cover member 22 between the covering position and uncovering position described above.

Referring again to FIG. 2, the support member 25 for supporting the cover member 22 has a projection 27 integrally or fixedly secured thereto, which projection 27 is inserted into an opening 33 formed in a elongated plate member 28 movably provided above the light exposing area 14. The opening 33 substantially has a triangular configuration with one edge 33a thereof close to the film being slanted with respect to the direction of movement of the plate member 28, as indicated by an arrow $A_2$. When inserting the projection 27 into the opening 33, the edge 33a slidingly engages with the projection 27. The elongated plate member 28 has two elongated guiding openings 29a and 29b formed at approximately opposite end portions of the plate member 28, in which openings pin projections 30a and 30b, respectively, fixedly mounted on the casing 1 are slidingly inserted therein to allow the reciprocation of the plate member 28 within a distance defined by the length of the elongated guiding openings 29a and 29b. At approximately the center of the elongated plate member 28 and on an edge further away from the film, there is provided a projection 31, while on an edge close to the film, there is provided another projection 36 which projections are fixedly formed on the plate member 28. The projection 31 is provided for the connection thereof with one end of a coil spring 32 while the other end of the coil spring 32 is connected with the body 1 so that the plate member 28 is normally urged towards right-hand side direction as indicated by an arrow $A_3$. The projection 36 is connected to the switch knob 8 positioned outside the body 1 for manually moving the plate member 28 between the right-hand side shifted position, namely off position, and the left-hand side shifted position, namely on position as indicated by an arrow $A_4$. Provided at the right-hand side of the plate member 28 is an arm member 37 provided to hold the plate member 28 in the on position against the biasing force of the spring 32. The arm member 37 has one end furthest from the plate member 28 pivotally connected to a pin projection 38 which is fixedly formed in the body 1, so as to rotate the arm member 37 about the pin projection 38. The arm member 37 is normally biased to rotate in a direction indicated by an arrow $A_5$ by a wire spring 43 mounted on the shaft 39 with one end thereof engaged with a projection 41 formed on the arm member 37 and the other end thereof engaged with a projection 42 formed in the body 1. The other end of the arm member 37 which partly overlaps the plate member 28, is formed with the recess 40 which engages a pin projection 39 fixedly or integrally formed on the plate member 28 when the plate member 28 is shifted to the on position. Since the engagement between the recess 40 and the pin projection 39 is effected by a click action, the plate member 28 can be simply disengaged upon manual operation of the switch knob 8.

When the superimposing device of the present invention is positioned at the off position, the pin projection 39 is disengaged from the recess 40 and is slidingly held in contact with the edge of the arm member 37, while at the same time, the projection 27 is positioned at the most left-hand side of the opening 33, namely the widened end, so that the cover member 22 is turned to the uncovering position. When the photographer is required to form the shaded background of data in the film, he manually moves the knob 8 from "off" to "on" in the direction indicated by the arrow $A_4$ to move the plate member 28 towards the left-hand side direction to engage the pin projection 39 with the recess 40. During the movement of the plate member 28 towards the left-hand side direction or the on position, the edge 33a of the opening 33 is slidingly held in contact with the projection 27 so that the projection 27 together with the cover member 22 is rotated about the shaft 26 in a direction opposite to the direction indicated by the arrow $A_1$ against the biasing force of the wire spring 26a, thus the cover member 22 is turned from the uncovering position to the covering position at the termination of movement of the plate member 28 in the on position.

It is to be noted that the plate member 28 is provided with a plate projection 34 at left-hand side thereof for holding a covering plate 35 which projects into the finder during the on position of the superimposing device of the present invention for partly preventing the light rays passing through the objective lens 16 from being directed to the recording area in the viewfinder.

In other words, the light rays produced from the information light source 10 and transmitted towards the viewfinder 7 employs the covering plate 35 as a background for the recording area, thus clearly and sharply forming the indicum or data in the finder. For this purpose, the cover plate 35 may be a color filter or a translucent material, or otherwise an opaque material.

At such position as described above, the photographer may see the covering plate 35 when he looks into the viewfinder, and thus he acknowledges that the superimposing device of the present invention is in on state. Thereafter, upon depressing the shutter button 4 approximately half way thereof, the lamp 9a employed in the information light source 10 is energized by the control means connected to the shutter button 4, and then the further depression of the shutter button 4 releases the shutter mechanism employed in the camera. After having taken the photograph with the background formed for the data in the film, the photographer returns the knob 8 from the "on" to "off" when he decides not to form such shaded background in the successive photograph, thereby the superimposing device of the present invention is returned back to the off position. According to such construction of the superimposing device of the present invention, the photographer, at any time, may turn on or turn off the device independently of the various operation for the camera.

In operating such camera as described above, turning on operation of the superimposing device is generally effected without any reminder to the photographer since he may turn on the knob 8 whenever he desires to have the data formed in the photograph, however, turning off operation thereof is apt to be forgotten before he takes the successive photograph, provided that he does not wish to have the shaded background formed in the successive photograph. For this purpose, the superimposing device of the present invention is provided with an automatic turning off mechanism arranged to operate in connection with winding up operation of the film or opening operation of the back cover 2. Such mechanism is described hereinbelow.

Still referring to FIG. 2, the automatic turning off mechanism capable of being actuated after every photograph shot comprises a cam member 45 provided at an intermediate point of the arm member 37, with peripheral edge of the cam member 45 being held in contact with the side edge of the arm member 37. A shaft of the cam member 45 is connected to a shaft of film take up spool 44, so that after each shooting of the photograph, the film take up spool 44 is rotated by a suitable film winding up mechanism of the prior art to wind up the exposed film on the film take up spool 44. Upon rotation of the film take up spool 44, the cam member 45 is simultaneously rotated to exert a pushing force on the arm member 37 to rotate about the shaft 38 in a direction opposite to the direction of the arrow $A_5$. Accordingly, the plate member 28 which has been held in on position by the engagement between the pin projection 39 and the recess 40 is released from the engagement and is moved towards the off position by the biasing force of the spring 32.

Another automatic turning off mechanism capable of being actuated when unloading the film comprises a lever 48 having two arms 48a and 48b with intermediate portion thereof rotatably supported by a shaft 46 fixedly extended from the body 1. One arm 48a is engaged with a projection 47 extended from an the arm member 37 from intermediate portion thereof where it is provided with a projection platform 37a, while the other arm 48b thereof is so extended as to come in contact with the back cover 2 when the back cover 2 is properly accommodated to cover the body 1. The lever 48 is normally biased to rotate in a direction indicated by an arrow $A_6$ by a wire spring 51 having one end engaged to a projection 49 extending from the arm 48a and the other end engaged to a projection 50 extending from the body 1. When closing the back cover 2, the inner wall thereof contacts the arm 48b and pushes the same to rotate the lever 48 in a direction opposite to the direction of the arrow $A_6$ against the spring force so that the other arm 48b disengages from the projection 47. Therefore, at this position, the arm member 37 is held in contact with the projection 39 provided on the plate member 28. Upon opening the back cover 2, the arm 48b is freed from the pushing force of the cover 2 and thus the lever 48 is rotated in the direction indicated by the arrow $A_6$ by the spring 51 to have the arm 48a come into contact with the projection 47 and further to move the projection 47. Accordingly, the arm member 37 is rotated in a direction opposite to the direction of the arrow $A_5$.

The application of such automatic turning off mechanism as described above in the superimposing device of the present invention enables the cover member 22 and the cover plate 35 to return to off position after every photograph shot. Therefore, there is no possibility that the photographer forgets to turn off the superimposing device. Furthermore, the turning off the superimposing device upon opening of the back cover 2 prevents the various elements in the superimposing device such as cover member 22 from being unwillingly touched by the photographer.

Referring to FIG. 3, there is shown another embodiment of the superimposing device of the present invention. The superimposing device of this embodiment comprises the optical arrangement F, the information light source 10, the lens assembly 12 and the cover member 22 movably provided for positioning between the covering position and the uncovering position. Since such elements are arranged in the same manner as described in the previous embodiment, further description therefor is omitted for the sake of brevity.

The cover member 22 made of light transmissive material such as filter as described above is hingedly provided on the shaft 26, through the support member 25, to rotate about the shaft 26 between the covering position, as shown by dotted line in FIG. 3, and the uncovering position as shown by real line in FIG. 3. The cover member 22 is normally biased towards the covering position by the helical spring 26a having one end thereof engaged with the support member 25 and the other end thereof engaged with the shaft 26. When the cover member 22 is turned to the covering position, the data recording area 15 is shaded therewith with respect to the light coming from the lens assembly 12 so as to form the shaded background for the data. When cover member 22 is in the uncovering position, such shaded background will not be formed in the area 15.

The description hereinbelow is directed to a mechanism for effecting movement of the cover member 22 between the covering position and the uncovering position described above.

Still referring to FIG. 3, the cover member 22 has a projection 27' having one end thereof fixed to or integrally formed with the support member 25 and the other end thereof is held in contact with an actuating arm 56. The actuating arm 56 has, at intermediate portion thereof, a projection 57 which is rotatably supported by the body 1 to rotate the actuating arm 56 about the projection 57. The actuating arm 56 is normally biased to rotate in a direction indicated by an arrow $A_7$ by a helical spring 59 mounted on the projection 57 with one end thereof engaged to a pin projection 58 fixedly formed on the body 1 and the other end thereof engaged to a projection 56c formed on the actuating arm 56. One end 56a of the actuating arm 56, which is opposite end to the end 56b where the projection 27' is in contact with the arm 56, is also held in contact with a tapered portion 60 which is connected to the shutter button 4.

Since the biasing force of the spring 59 is stronger than that of the spring 26, the cover member 22 is normally maintained in the uncovering position (FIG. 4a). Upon depression of the shutter button 4 in a direction indicated by an arrow $A_8$, the tapered portion 60 pushes the end 56a to rotate the actuating arm 56 in a direction opposite to the arrow $A_7$ against the biasing force of the spring 59. Accordingly, the end 56b moves in a predetermined distance to move the projection 27' therewith which in turn moves the cover member 22 towards the covering position. At approximately the end of the downward stroke of the shutter button 4, the cover member 22 terminates in the covering position, and at such position, the shutter button 4 releases the shutter mechanism, thereby forming the shaded background in the area 15 on the film surface 14 (FIG. 4b). Thereafter, the cover member 22 is returned to the uncovering position by the return stroke or upward stroke of the shutter button 4. At approximately the end of the upward stroke of the shutter button 4, the information light source 10 is so arranged as to project image light carrying data over the area 15 for a predetermined period of time (FIG. 4c). Then, the superimposing device is returned to the original position (FIG. 4d). Here, it is to be noted that, instead of projecting the image light carrying data directly over the area 15, the image light of data may be projected over the area 15 through the cover member 22, since the cover member 22 is constructed of light transmissive material. In this case, the information light source 10 may be so arranged as to project image light carrying data at approximately the end of the downward stroke of the shutter button 4.

In the case where the shaded background is not required, a lock mechanism is provided to maintain the cover member 22 in the uncovering position regardless of pushing of the shutter button 4. The lock mechanism comprises an elongated plate member 28' movably provided above the light exposing area 14 to reciprocate between on position and off or lock position by the actuation of the knob 8 provided on the outside of the body 1. The plate member 28' has two guiding openings 29a and 29b to guide the plate member 28' in the same manner described above in relation to the plate member 28. The plate member 28' is particularly provided with an engaging projection 55 which, when the plate member 28' is turned to the off position, is located closely in front of the projection 27' to prevent the cover member 22 from turning to the covering position. Since the plate member 28' also has the covering plate 35 which projects into the viewfinder during the on position of the superimposing device as in the same manner as described in the previous embodiment, it is possible to acknowledge the presentation of cover member 22 in the covering position.

It is to be noted that, in the first and second embodiments, the cover member 22 as well as the covering plate 35 which are described as made of light transmissive material can be made of an opaque material such as a solid metallic plate. In this case, it is necessary to terminate the cover member 22 in the covering position during the exposure of the light image of the object on the film surface, and in the uncovering position during the exposure of light image of the data on the area 15. Such arrangement can be simply obtained by the control means connected to the lamp 9a.

It is to be noted that the superimposing device of the second embodiment may be provided with normally closed gate means and the automatic turning off mechanism which are described above in connection with the first embodiment.

As is apparent from the foregoing description, the superimposing device of the present invention will provide a clear and sharp data in a viewfinder over a background which is established by the presentation of the covering plate 35 intruding into the viewfinder.

Furthermore, since the covering plate 35 is so arranged as to change the position thereof with respect to the change in the condition of the plate member 28 or 28', i.e., the switch knob 8, it is possible to selectively provide the shaded background in the viewfinder.

Although the present invention has been fully described by way of examples with reference to the accompanying drawings, it is to be noted that various changes and modifications are apparent to those skilled in the art. Therefore, unless such changes and modifications depart from the scope of the present invention, they should be construed as included therein.

What is claimed is:

1. A superimposing device for use in a data-recording camera for interposing data on a film over an image of an object and for producing said data in a viewfinder having a view-taking window for receiving therein a light image of the object and an eye-piece, said superimposing device comprising:

a source of light which produces light image of data;

means for defining a first optical path for projecting said light image of the object onto the eye-piece;

means for defining a second optical path for projecting said light image of the data onto the eye-piece at a predetermined portion thereof;

first blocking means provided adjacent said viewtaking window, means for changing the condition thereof between a blocking condition, in which said first blocking means intercepts said first optical path to block the light directed to said predetermined portion of said eye-piece and an open condition, in which said first blocking means is released from blocking said first optical path; and first actuating means for actuating said changing means to shift said first blocking means between said blocking condition and said open condition, whereby upon actuation of said first actuating means, said first blocking means changes from open condition to said blocking condition and said first blocking means prevents said predetermined portion of the eye-piece which is constituting a background of the data from being lighted by the light image of the object and thus the data is clearly formed in said predetermined portion of the eye-piece.

2. A superimposing device as claimed in claim 1, further comprising:

means for defining a third optical path for projecting a light image of the object on the film surface upon release of a shutter mechanism employed in the camera;

means for defining a fourth optical path for projecting said light image of data on said film surface at a predetermined portion thereof upon release of said shutter mechanism, said predetermined portion of film surface corresponding with said predetermined portion of said eye-piece;

second blocking means provided adjacent said film surface to change condition thereof between a first condition, in which said second blocking means intercepts said third and fourth optical paths to block the light directed to said predetermined portion of said film surface and a second condition, in which said second blocking means is released from blocking said third and fourth optical paths; and second actuating means provided for shifting said second blocking means between said blocking condition and said open condition;

whereby upon actuation of said second actuating means to shift said second blocking means from open condition to said blocking condition, said second blocking means prevents said predetermined portion of the film which is constituting a background of the data from being exposed by the light image of the object and thus the data is clearly formed in said predetermined portion of said film.

3. A superimposing device as claimed in claim 2, wherein said first and second actuating means are connected with a manually operable switch provided on the camera for simultaneously operating said first and second blocking means.

4. A superimposing device as claimed in claim 2, wherein said first actuating means is connected to a manually operable switch provided on the camera, and said second actuating means is connected to a depressible shutter button employed for operating said shutter mechanism upon depression of the shutter button, said second actuating means being actuated to shift the second blocking means to said blocking condition upon depression of the shutter button, and to shift the second blocking means to said open condition upon return of said shutter button to a projected position.

5. A superimposing device as claimed in claim 4, wherein said first actuating means is coupled to said second actuating means in such a manner as to maintain the second actuating means, regardless of depression of the shutter button, in said open condition when said first actuating means places said second blocking means in said open condition.

6. A superimposing device as claimed in claim 1, wherein said first blocking means includes a light transmissive material for reducing, during said first blocking means present in said blocking condition, the intensity of light directed to said predetermined portion of said eye-piece.

7. A superimposing device as claimed in claim 1, wherein said first blocking means includes an opaque plate member for completely blocking, when said first blocking means is in said blocking condition, the light directed to said predetermined portion of said eye-piece.

* * * * *